(12) United States Patent
Yoshida

(10) Patent No.: US 6,570,677 B2
(45) Date of Patent: *May 27, 2003

(54) COMMUNICATING APPARATUS

(75) Inventor: Takehiro Yoshida, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,396

(22) Filed: Dec. 2, 1998

(65) Prior Publication Data

US 2003/0011825 A1 Jan. 16, 2003

(30) Foreign Application Priority Data

Dec. 5, 1997 (JP) .............................................. 9-352382

(51) Int. Cl.[7] .................................................. H04N 1/00
(52) U.S. Cl. .................... 358/434; 358/435; 358/436; 358/407; 379/100.05; 379/100.06; 379/100.09
(58) Field of Search ................................ 358/434, 435, 358/436, 438–439, 407; 379/100.01, 100.05–100.06, 100.09; 340/351, 3.1, 3.2; 710/220, 47, 46

(56) References Cited

U.S. PATENT DOCUMENTS

| | | | | |
|---|---|---|---|---|
| 4,729,033 A | * | 3/1988 | Yoshida | 358/257 |
| 5,216,705 A | * | 6/1993 | Yoshida et al. | 379/100 |
| 5,270,833 A | * | 12/1993 | Kubokawa et al. | 358/434 |
| 5,307,179 A | * | 4/1994 | Yoshida | 358/440 |
| 5,671,270 A | * | 9/1997 | Yoshida | 379/100 |
| 5,692,036 A | * | 11/1997 | Saito | 379/216.01 |
| 5,847,842 A | * | 12/1998 | Maeda | 358/434 |
| 6,005,672 A | * | 12/1999 | Yoshida | 358/434 |
| 6,072,597 A | * | 6/2000 | Yoshida | 358/435 |
| 6,104,504 A | * | 8/2000 | Imai et al. | 358/407 |
| 6,281,987 B1 | * | 8/2001 | Yoshida | 358/434 |
| 6,456,398 B1 | * | 9/2002 | Yoshida | 358/400 |

FOREIGN PATENT DOCUMENTS

| | | | | |
|---|---|---|---|---|
| EP | 674424 | * | 3/1995 | ............ H04N/1/32 |
| JP | 361170162 | * | 7/1986 | ............ H04L/11/00 |
| JP | 406334827 | * | 12/1994 | ............ H04N/1/32 |
| JP | 09-200479 | * | 7/1997 | ............ H04N/1/32 |
| JP | 09-247292 | * | 9/1997 | ........... H04M/11/00 |
| JP | 409284530 | * | 10/1997 | ............ H04N/1/32 |
| JP | 410257287 | * | 9/1998 | ............ H04N/1/32 |
| JP | 410322534 | * | 12/1998 | ............ H04N/1/32 |
| JP | 2000-134449 | * | 5/2000 | ............ H04N/1/32 |
| JP | 2001-007941 | * | 1/2001 | ........... H04M/11/00 |
| JP | 2001-186316 | * | 7/2001 | ............ H04N/1/32 |

* cited by examiner

Primary Examiner—Edward Coles
Assistant Examiner—Tia A. Carter
(74) Attorney, Agent, or Firm—Fitzpatrick, Cella, Harper & Scinto

(57) ABSTRACT

In a selective polling communication, the apparatus on the reception side is allowed to properly recognize the absence of polling transmission information in a designated memory box. If there is no polling transmission information in the memory box, a DIS signal in which bit 47 of the FIF in the DIS signal is set to "0" (there is no SEP receiving function) is transmitted upon automatic reception. If at least one or more polling transmission information has been stored in the memory box, a DIS signal in which bit 47 of the FIF in the DIS signal is set to "1" (there is the SEP receiving function) is transmitted upon automatic reception. After that, if the polling transmission information does not exist in the memory box designated by the SEP signal transmitted from the partner polling receiver, a DIS signal in which bit 47 of the FIF in the DIS signal is set to "0" (there is no SEP receiving function) is transmitted and this fact is notified to the partner apparatus.

21 Claims, 7 Drawing Sheets

COMMUNICATING APPARATUS

BACKGROUND OF THE INVENTION

1. Field of the Invention

The present invention particularly relates to a communicating apparatus of a facsimile apparatus or the like having a selective polling transmitting function.

2. Related Background Art

In a conventional facsimile apparatus having a selective polling transmitting function, a DIS signal with indicating the possession of an SEP signal receiving function is transmitted upon automatic reception and, after that, a DCN signal is transmitted if information to be polling transmitted does not exist in a memory box designated by the received SEP signal.

In the operation as mentioned above, however, in a facsimile apparatus on the side for performing the polling reception, since the DCN signal is received after transmission of a signal of a DTC group, although the operation is shifted to a line disconnection, a reason for the line disconnection is unclear.

That is, as reasons of the line disconnection in this case, there are considered various reasons such that: (1) the transmission information does not exist in the memory box designated by the SEP signal; (2) passwords do not coincide; (3) a polling transmitter determines that an illegal signal has been received; and the like. There is, consequently, a problem such that a proper correspondence cannot be made in response to the received DCN signal.

SUMMARY OF THE INVENTION

It is an object of the invention to provide a communicating apparatus which can allow a reception side apparatus to properly recognize that there is in a selective polling communication no polling transmission information in a designated memory box.

DETAILED DESCRIPTION OF THE PREFERRED EMBODIMENT

Figure 1:
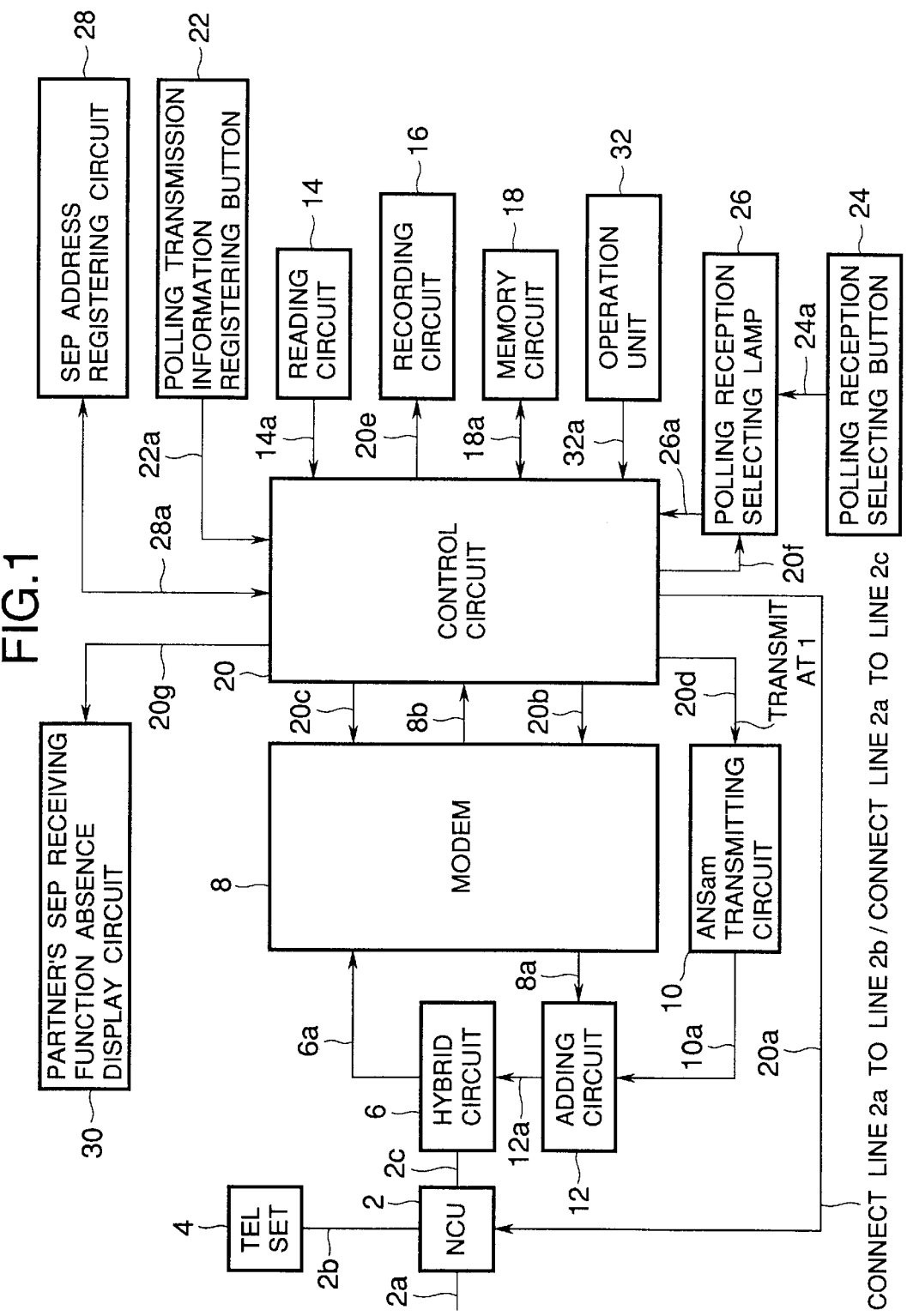
FIG. 1 is a block diagram showing an embodiment of the invention.
Figure 2:
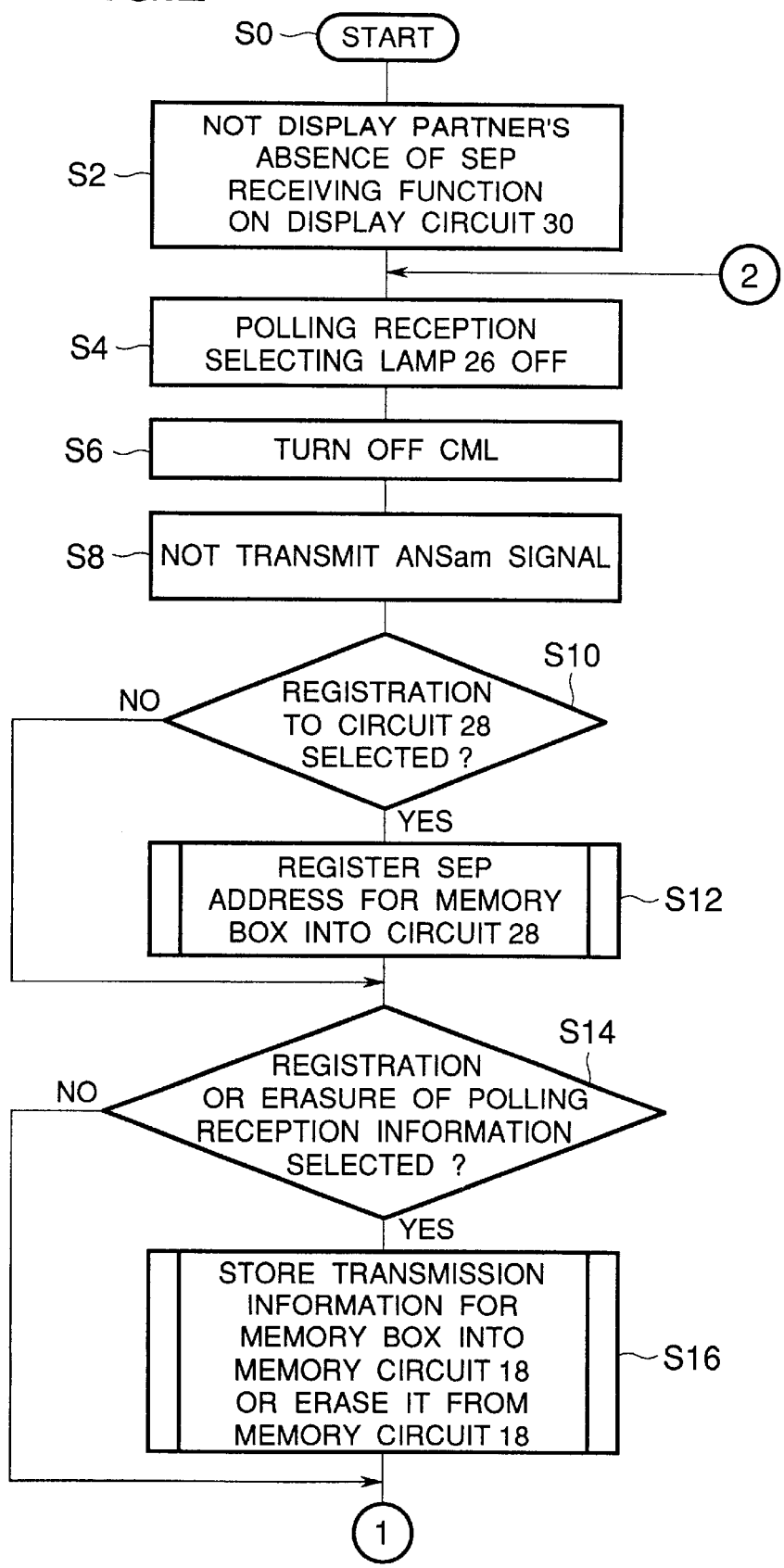
FIG. 2 is a flowchart showing the operation of the embodiment.
Figure 3:
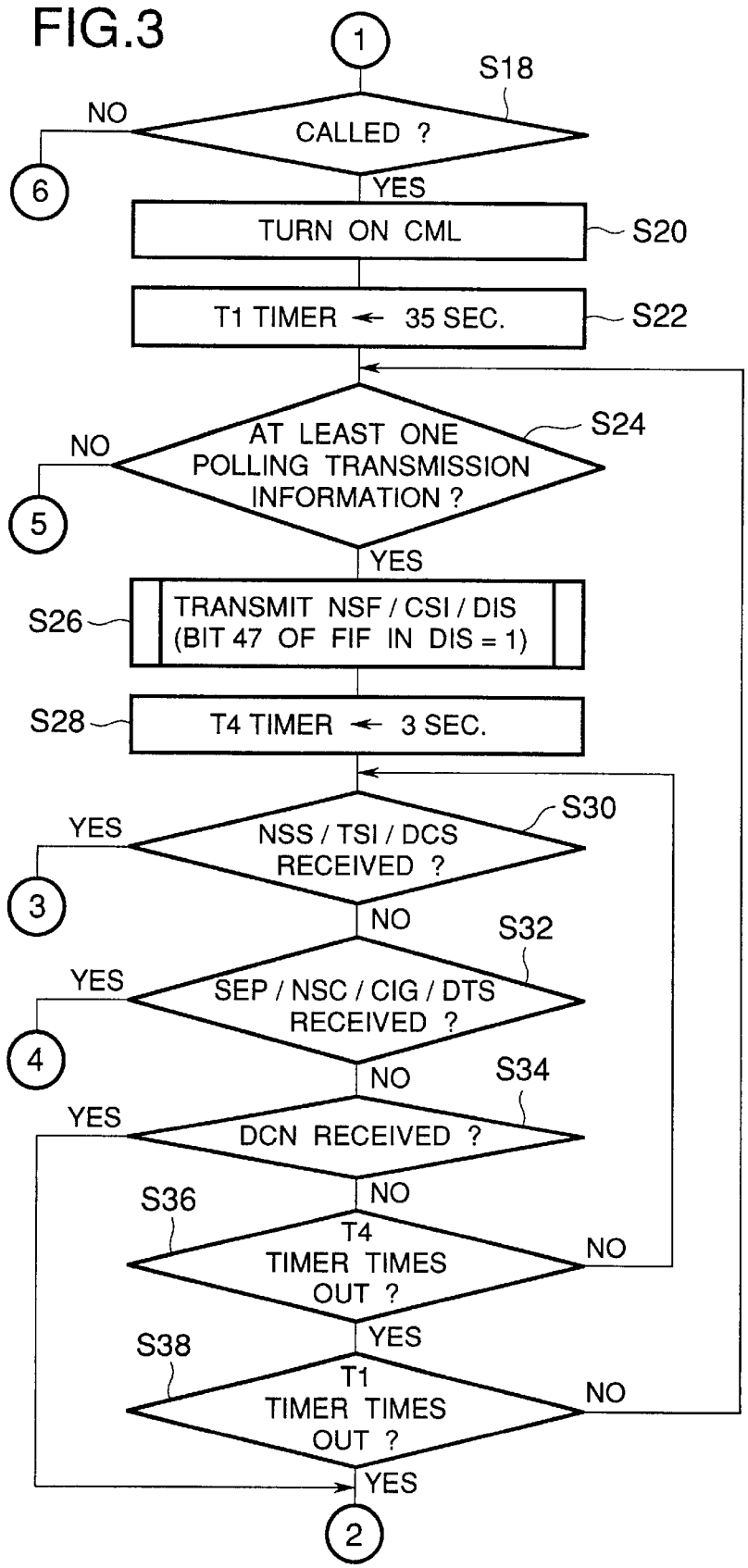
FIG. 3 is a flowchart showing the operation of the embodiment.
Figure 4:
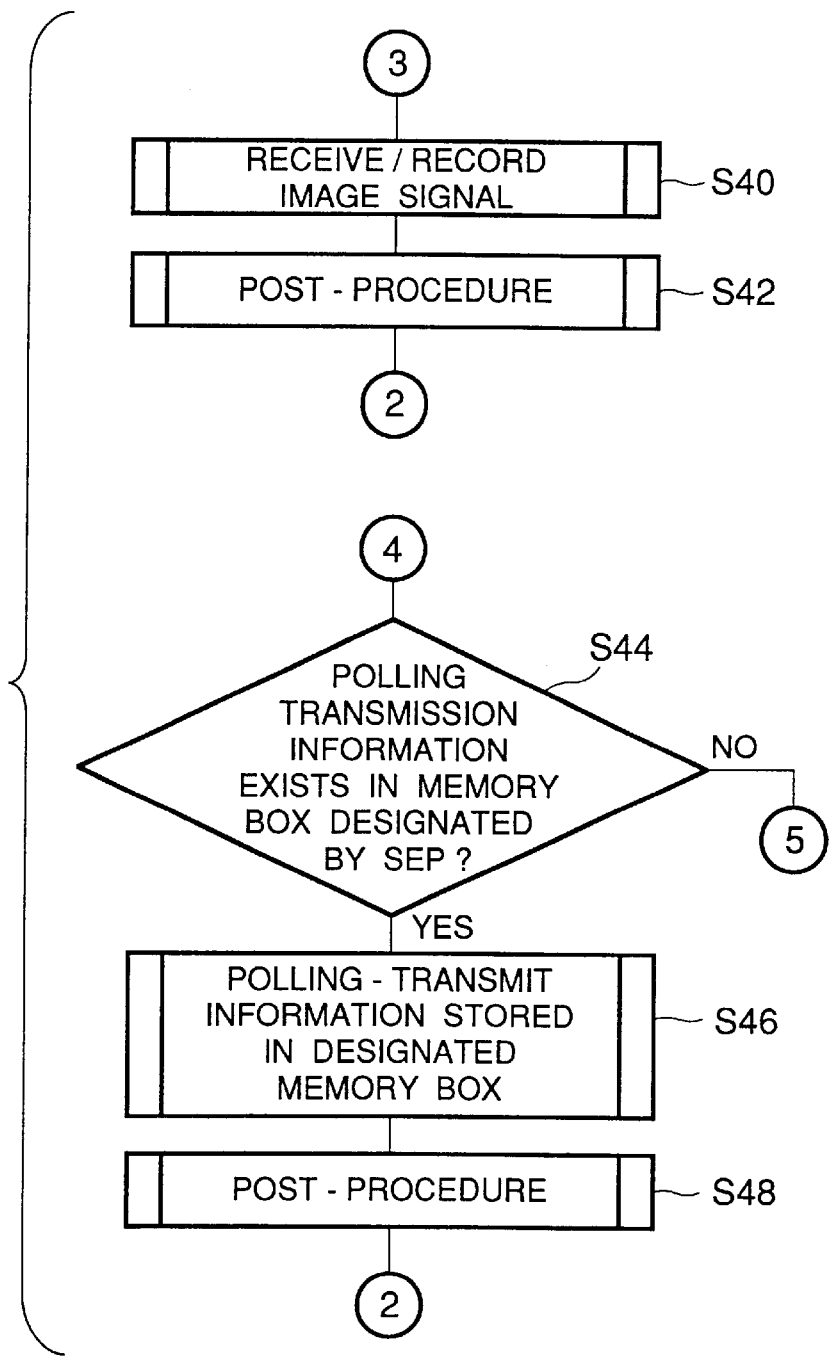
FIG. 4 is a flowchart showing the operation of the embodiment.
Figure 5:
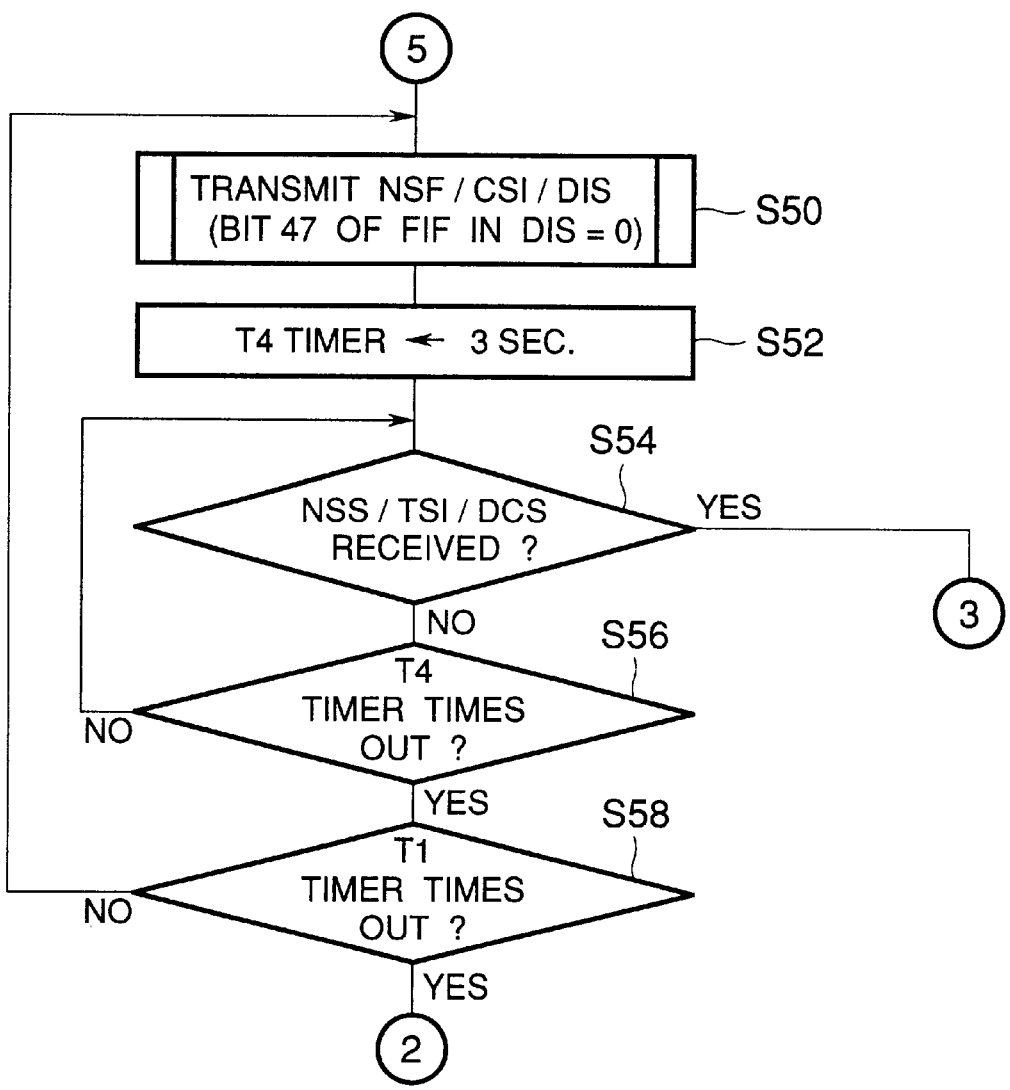
FIG. 5 is a flowchart showing the operation of the embodiment.
Figure 6:
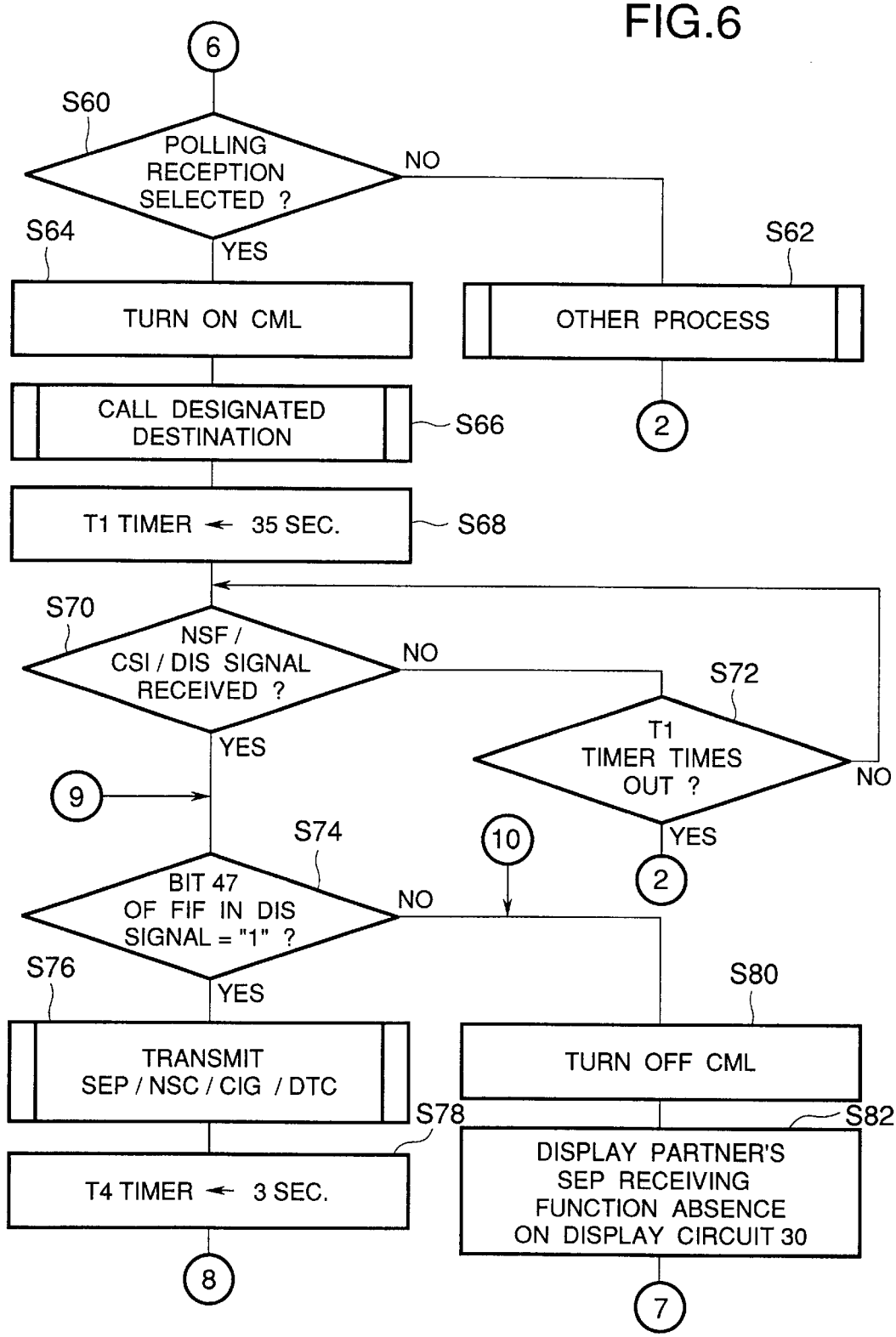
FIG. 6 is a flowchart showing the operation of the embodiment.
Figure 7:
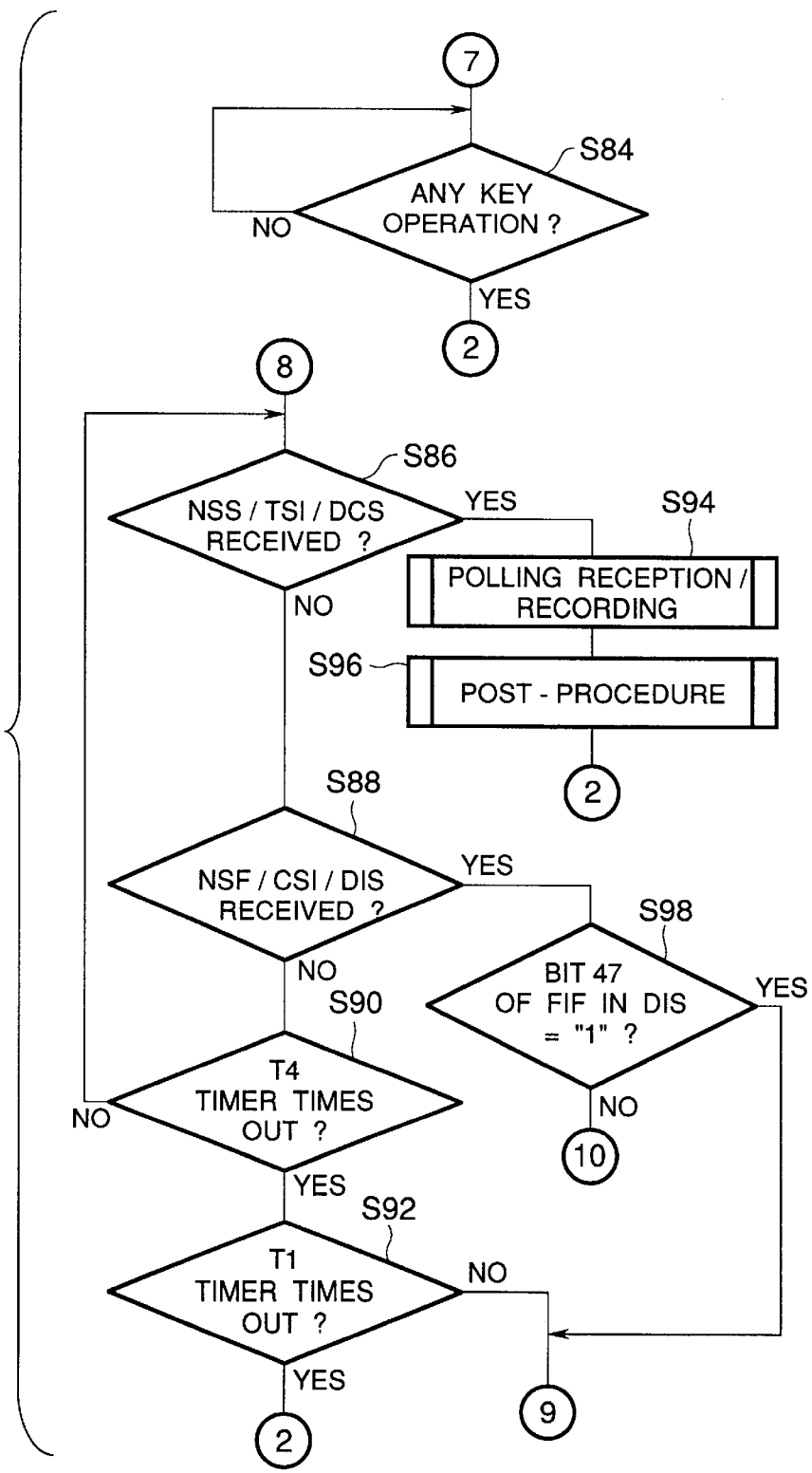
FIG. 7 is a flowchart showing the operation of the embodiment.

FIG. 1 is a block diagram showing a construction of a facsimile apparatus according to an embodiment of the present invention.

To use a telephone network for a data communication or the like, an NCU (network control unit) 2 is connected to a terminal equipment of a line, performs a connection control of a telephone exchange network, performs a switching to a data communication path, or holds a loop. When a level of a signal (signal line 20a) from a control circuit 20 is equal to "0", the NCU 2 connects a telephone line 2a to the side of a telephone set 4. When the signal level is equal to "1", the NCU 2 connects the telephone line 2a to the side of a facsimile apparatus. In an ordinary state, the telephone line 2a is connected to the telephone set 4 side.

A hybrid circuit 6 separates a signal of a transmission system and a signal of a reception system, sends a transmission signal from an adding circuit 12 to the telephone line 2a via the NCU 2, receives a signal from the partner side via the NCU 2, and transfers it to a modulator and demodulator (hereinafter, referred to as an MODEM) 8 via a signal line 6a.

The MODEM 8 executes a modulation and a demodulation based on the ITU-T Recommendation V.8, V.21, V.27ter, V.29, V.17, and V.34 and each transmitting mode is designated by a signal line 20c. The MODEM 8 inputs a signal outputted onto a signal line 20b and outputs modulated data to a signal line 8a. The MODEM 8 inputs a reception signal outputted onto the signal line 6a and outputs demodulated data to a signal line 8b.

An ANSam transmitting circuit 10 is a circuit for transmitting an ANSam signal. When a signal at the signal level "1" is outputted to a signal line 20d, the ANSam transmitting circuit 10 transmits the ANSam signal to a signal line 10a. When a signal at the signal level "0" is outputted to the signal line 20d, the ANSam transmitting circuit 10 does not transmit any signal to the signal line 10a.

The adding circuit 12 inputs information on the signal line 8a and information on the signal line 10a and outputs an addition result to a signal line 12a. A reading circuit 14 reads an image of an original and outputs the read image data to a signal line 14a. A recording circuit 16 sequentially records information outputted onto a signal line 20e every line.

A memory circuit 18 is used to store raw information of the read data or encoded information or to store reception information or decoded information or the like.

A polling transmission information registering button (or key) 22 is a button (or key) which is depressed in case of designating a memory box and storing polling transmission information into the memory circuit 18. When the button 22 is depressed, a depression pulse is generated on a signal line 22a.

A polling reception selecting button (key) 24 is a button which is depressed when a polling reception is selected. When the button 24 is depressed, a depression pulse is generated to a signal line 24a.

When a clear pulse is generated on a signal line 20f, a polling reception selecting lamp 26 is lit off and, after that, light-on→light-off→light-on is repeated each time the depression pulse is generated on the signal line 24a. The polling reception selecting lamp 26 generates a signal at the signal level "1" to a signal line 26a when it is ON. The lamp 26 generates a signal at the signal level "0" when it is OFF.

An SEP address registering circuit 28 is a circuit for registering an SEP address in correspondence to the memory box. The SEP address registering circuit 28 registers SEP addresses in correspondence to maximum 100 memory boxes (0 to 99) through a signal line 28a.

A display circuit 30 is a circuit such that in the case where a partner apparatus does not have an SEP receiving function, a message showing this fact is displayed to a facsimile apparatus (self apparatus) which has tried to perform a selective polling reception. When a signal at the signal level "1" is outputted on a signal line 20g, the display circuit 30 displays such a message. When a signal at the signal level "0" is outputted to the signal line 20g, the display circuit 30 does not display such a message.

One-touch dial buttons (or keys), abbreviation dial buttons (or keys), ten-keys, * • # keys, a set key, a start key, a registering key to the circuit 28, and other function keys are arranged on an operation unit (or console unit) 32. Information of a depressed key is outputted to a signal line 32a.

The control circuit 20 controls a whole facsimile apparatus which can perform a selective polling transmission and notifies the partner apparatus of the presence or absence of a receiving function of an SEP signal by an initial identification signal at the time of automatic reception. In response to a set state of polling transmission information of the self apparatus, the control circuit 20 executes processes for changing the presence or absence of the receiving function of the SEP signal upon automatic reception and notifying the partner apparatus of a change result.

Specifically speaking, if none of the polling transmission information exists in the memory box, a DIS signal in which bit 47 of the FIF in the DIS signal is set to 0 (there is no SEP receiving function) is transmitted upon automatic reception. On the other hand, if at least one or more of the polling transmission information has been stored in the memory box, a DIS signal in which bit 47 of the FIF in the DIS signal is set to 1 (there is the SEP receiving function) is transmitted upon automatic reception and, after that, when there is no polling transmission information in the designated memory box by the SEP signal transmitted from the partner apparatus, namely, the polling receiver, a DIS signal in which bit 47 of the FIF in the DIS signal is set to 0 (there is no SEP receiving function) is transmitted and a message showing such a fact is notified to the partner apparatus.

In a polling receiving terminal which has received the DIS signal indicative of the absence of the SEP receiving function, a control is performed so as to display a message indicative of such a fact.

FIGS. 2 to 7 are flowcharts showing a flow for a control of the control circuit 20 in the embodiment.

The operation is started in step S0. In step S2, a signal at the signal level "0" is outputted to the signal line 20g, thereby setting a state where the absence of the SEP receiving function in the partner apparatus is not displayed on the display circuit 30. In step S4, a clear pulse is generated on the signal line 20f, thereby setting a state where the polling reception selecting lamp 26 is lit off.

In step S6, a signal at the signal level "0" is outputted to the signal line 20a, thereby turning off the CML. In step S8, a signal at the signal level "0" is outputted to the signal line 20d, thereby setting a state where the ANSam signal is not transmitted.

In step S10, information on the signal line 32a is inputted and whether the registration to the registering circuit 28 has been selected or not is discriminated. When it is selected, step S12 follows and the SEP address is registered into the registering circuit 28 through the signal line 28a in correspondence to the memory box. The processing routine advances to step S14. When the registration is not selected, the processing routine directly advances to step S14.

In step S14, the information on the signal lines 22a and 32a are inputted and a check is made to see if the registration or erasure of the polling transmission information has been selected. If YES, step S16 follows and the transmission information is stored into the memory circuit 18 or is erased from the memory circuit 18, in correspondence to the memory box. The processing routine advances to step S18. If NO, the processing routine directly advances to step S18.

In step S18, whether there is the reception or not is discriminated. If YES, step S20 follows. If NO, step S60 follows.

In step S20, a signal at the signal level "1" is outputted to the signal line 20a, thereby turning on the CML. In step S22, the time of 35 seconds is set into a T1 timer.

In step S24, a check is made to see if at least one or more information to be polling transmitted exists in the memory box. If YES, step S26 follows. If there is no information to be polling transmitted, step S50 follows.

In step S26, an NSF/CSI/DIS signal (it is assumed that bit 47 of the FIF in the DIS signal is equal to "1" and there is the SEP receiving function) is transmitted. In step S28, the time of 3 seconds is set into a T4 timer.

In steps S30, S32, S34, and S36, a check is made to see if the NSS/TSI/DCS signal, SEP/NSC/CIG/DTC signal, or DCN signal has been received before the T4 timer times out. When the NSS/TSI/DCS signal is received, step S40 follows. When the SEP/NSC/CIG/DTC signal is received, step S44 follows. When the DCN signal is received, step S4 follows. When the T4 timer times out, step S38 follows.

In step S38, a check is made to see if the T1 timer has timed out. If YES, step S4 follows. If NO, step S24 follows. In step S40, the reception and recording of the image signal are executed, a post procedure is executed (step S42), and the processing routine advances to step S4.

In step S44, a check is made to see if the transmission information exists in the memory box designated by the SEP signal. If YES, step S46 follows, the information stored in the designated memory box is polling transmitted. The post procedure is executed (S48) and step S4 follows.

When there is no transmission information in the memory box designated by the SEP signal, step S50 follows. In step S50, the NSF/CSI/DIS signal (bit 47 of the FIF in the DIS signal is set to "0" and there is not the SEP receiving function) is transmitted. In step S52, the time of 3 seconds is set into the T4 timer.

In steps S54 and S56, a check is made to see if the NSS/TSI/DCS signal has been received before the T4 timer times out. When the NSS/TSI/DCS signal is received, step S40 follows. When the T4 timer times out, step S58 follows.

In step S58, a check is made to see if the Ti timer has timed out. If YES, step S4 follows. If NO, step S50 follows.

In step S60, the information on the signal lines 26a and 32a is inputted and whether the polling reception has been selected or not is discriminated. When it is selected, step S64 follows. If NO, step S62 follows and another process is executed. Step S4 follows.

In step S64, a signal at the signal level "1" is outputted to the signal line 20a, thereby turning on the CML. In step S66, a call is issued to the designated destination. In step S68, the time of 35 seconds is set into the T1 timer.

In steps S70 and S72, a check is made to see if the NSF/CSI/DIS signal has been received before the T1 timer times over. When the NSF/CSI/DIS signal is received, step S74 follows. When the T1 timer times out, step S4 follows.

In step S74, a check is made to see if bit 47 of the FIF in the DIS signal is equal to "1" (whether the SEP receiving function exists). If it is equal to "1", step S76 follows. If it is equal to "0", step S80 follows.

In step S76, the SEP/NSC/CIG/DTC signal is transmitted. In step S78, the time of 3 seconds is set into the T4 timer and step S86 follows.

In step S80, a signal at the signal level "0" is outputted to the signal line 20a, thereby turning off the CML. In step S82, a signal at the signal level "1" is outputted to the signal line 20g and the partner apparatus displays a message indicative of the absence of the SEP receiving function on the display circuit 30. After that, in step S84, the information on the signal line 32a is inputted and whether some key has been operated or not is discriminated. If YES, step S4 follows.

In steps S86, S88, and S90, a check is made to see if the NSS/TSI/DCS signal or the NSF/CSI/DIS signal has been received before the T4 timer times out. When the NSS/TSI/DCS signal is received, step S94 follows. When the NSF/CSI/DIS signal is detected, step S98 follows. When the T4 timer times out, step S92 follows.

In step S92, whether the T1 timer has timed out or not is discriminated. If YES, step S4 follows. If NO, step S76 follows.

In step S94, the polling reception and recording are executed. In step S96, a post procedure is executed and the processing routine advances to step S4.

In step S98, a check is made to see if bit 47 of the FIF in the DIS signal is equal to "1" (there is the SEP receiving function). If it is equal to "1", step S76 follows. If it is equal to "0", step S80 follows.

The operation of the control circuit as mentioned above is executed by the CPU in the control circuit on the basis of the program stored in an ROM, an RAM, or the like in the control circuit. However, the present invention may also be constructed in a manner such that this program is stored into any one of various external storing media such as floppy disk, hard disk, optical disk, magnetooptic disk, CD-ROM, memory card, and the like, the program is read out from such an external storing medium by a dedicated reading apparatus is stored into the control circuit, and the program is executed by the CPU in the control circuit.

Although the above embodiment has been described with respect to the facsimile apparatus of the stand alone type as an example, the present invention is not limited to such an example. For instance, the present invention may be applied to a data communication control in a synthetic data processing system in which a copying function and an electronic filing function and, further, a data processing function are combined to a communicating function. The present invention may also be similarly applied to a communicating apparatus which is separated from a reading circuit or a recording circuit.

As described above, according to the present invention, the communicating apparatus on the side where the polling reception is performed can execute a proper control according to the set state of the polling transmission information of the communicating apparatus on the reception side. Specifically speaking, in the communicating apparatus on the reception side, a fact that there is no polling transmission information in the memory box designated by the SEP signal from the calling generating side can be recognized on the calling side, thereby enabling the polling receiving apparatus (calling side) to take a proper measure.

According to the present invention, in the case where there is the polling transmission information in at least one or more memory boxes and the polling transmission information does not exist in the memory box designated by the SEP signal, such a fact can be notified to the polling receiving apparatus, thereby enabling the partner apparatus to take a proper measure.

According to the present invention, the operator of the polling receiving apparatus can recognize that there is no polling transmission information in the designated memory box, thereby enabling the operator of the polling receiving apparatus to take a proper measure.

What is claimed is:

1. A communication apparatus that can perform a selective polling transmission for transmitting polling transmission information designated by a polling receiving station, said apparatus comprising:

a notification unit adapted to notify the polling receiving station of a presence or an absence of a receiving function of an SEP signal in an initial identification signal at a time of an automatic reception in an automatic receiving terminal;

a memory adapted to store therein polling transmission information; and a judgment unit adapted to judge whether or not polling transmission information is stored in said memory, wherein, when said judgment unit judges that no polling transmission information is stored in said memory, said notification unit notifies the polling receiving station of the absence of the receiving function of the SEP signal.

2. An apparatus according to claim 1, wherein, when said judgment unit judges that at least one item of polling transmission information is stored in said memory, said notification unit notifies the polling receiving station of the presence of the receiving function of the SEP signal.

3. An apparatus according to claim 2, wherein, when polling transmission information corresponding to the SEP signal, received from the polling receiving station after said notification unit notifies the polling receiving station of the presence of the receiving function of the SEP signal, is not stored in said memory, said notification unit again notifies the polling receiving station of the absence of the receiving function of the SEP signal.

4. An apparatus according to claim 1, wherein, at the polling receiving station which receives an initial identification signal indicating an absence of the receiving function of the SEP signal, that fact is displayed.

5. An apparatus according to claim 3, wherein said memory comprises a memory box, and wherein said judgment unit compares a received SEP signal with an SEP signal registered in advance corresponding to the memory box, and a presence or an absence of the receiving function of the SEP signal is declared in accordance with a comparison result.

6. A communication apparatus that can perform a selective polling transmission for transmitting polling transmission information designated by a polling receiving station, said apparatus comprising:

a notification unit adapted to notify the polling receiving station of a presence or an absence of a receiving function of an SEP signal in an initial identification signal at a time of an automatic reception in an automatic receiving terminal;

a memory adapted to store therein polling transmission information; and a judgment unit adapted to judge whether or not polling transmission information is stored in said memory, wherein, when polling transmission information corresponding to an SEP signal received from the polling receiving station is not stored in said memory, said notification unit notifies the polling receiving station of the absence of the receiving function of the SEP signal.

7. An apparatus according to claim 6,
wherein said memory comprises a memory box, and
wherein said judgment unit compares a received SEP signal with an SEP signal registered in advance corresponding to the memory box, and a presence or an absence of the receiving function of the SEP signal is declared in accordance with a comparison result.

8. A communication method of a communication apparatus that can perform a selective polling transmission for transmitting polling transmission information designated by a polling receiving station, said method comprising:

a notification step, of notifying the polling receiving station of a presence or an absence of a receiving function of an SEP signal in an initial identification signal at a time of an automatic reception in an automatic receiving terminal;

a storage step, of storing polling transmission information in a memory; and a judgment step, of judging whether or not polling transmission information is stored in the memory,
wherein, when it is judged in said judgment step that no polling transmission information is stored in the memory, said notification step notifies the polling receiving station of the absence of the receiving function of the SEP signal.

9. A method according to claim 8, wherein, when it is judged in said judgment step that at least one item of polling transmission information is stored in the memory, said notification step includes notifying the polling receiving station of the presence of the receiving function of the SEP signal.

10. A method according to claim 9, wherein, when polling transmission information corresponding to the SEP signal, received from the polling receiving station after said notification step notifies the polling receiving station of the presence of the receiving function of the SEP signal, is not stored in the memory, said notification step includes again notifying the polling receiving station of the absence of the receiving function of the SEP signal.

11. A method according to claim 8, further comprising a display step, of, at the polling receiving station which receives an initial identification signal indicating an absence of the receiving function of the SEP signal, displaying that fact.

12. A method according to claim 10,
wherein the memory comprises a memory box, and
wherein said judgment step includes comparing a received SEP signal with an SEP signal registered in advance corresponding to the memory box, and declaring presence or an absence of the receiving function of the SEP signal in accordance with a comparison result.

13. A communication method of a communication apparatus that can perform a selective polling transmission for transmitting polling transmission information designated by a polling receiving station, said method comprising:

a notification step, of notifying the polling receiving station of a presence or an absence of a receiving function of an SEP signal in an initial identification signal at a time of an automatic reception in an automatic receiving terminal;

a storage step, of storing polling transmission information in a memory; and a judgment step, of judging whether or not polling transmission information is stored in the memory,
wherein, when polling transmission information corresponding to an SEP signal received from the polling receiving station is not stored in the memory, said notification step includes notifying the polling receiving station of the absence of the receiving function of the SEP signal.

14. A method according to claim 13,
wherein the memory comprises a memory box, and
wherein said judgment step includes comparing a received SEP signal with an SEP signal registered in advance corresponding to the memory box, and declaring a presence or an absence of the receiving function of the SEP signal in accordance with a comparison result.

15. A computer-readable storage medium storing a program for implementing a communication method of a communication apparatus that can perform a selective polling transmission for transmitting polling transmission information designated by a polling receiving station, the program comprising:

code for a notification step, of notifying the polling receiving station of a presence or an absence of a receiving function of an SEP signal in an initial identification signal at a time of an automatic reception in an automatic receiving terminal;

code for a storage step, of storing polling transmission information in a memory; and code for a judgment step, of judging whether or not polling transmission information is stored in the memory,
wherein, when it is judged in the judgment step that no polling transmission information is stored in the memory, the notification step includes notifying the polling receiving station of the absence of the receiving function of the SEP signal.

16. A storage medium according to claim 15, wherein, when it is judged in the judgment step that at least one item of polling transmission information is stored in the memory, the notification step includes notifying the polling receiving station of the presence of the receiving function of the SEP signal.

17. A storage medium according to claim 16, wherein, when polling transmission information corresponding to the SEP signal, received from the polling receiving station after the notification step notifies the polling receiving station of the presence of the receiving function of the SEP signal, is not stored in the memory, the notification step includes again notifying the polling receiving station of the absence of the receiving function of the SEP signal.

18. A storage medium according to claim 15, wherein the program further comprises code for a display step, of, at the polling receiving station which receives an initial identification signal indicating an absence of the receiving function of the SEP signal, displaying that fact.

19. A storage medium according to claim 17,
wherein the memory comprises a memory box, and
wherein the judgment step includes comparing a received SEP signal with an SEP signal registered in advance corresponding to the memory box, and declaring presence or an absence of the receiving function of the SEP signal in accordance with a comparison result.

20. A computer-readable storage medium storing a program for implementing a communication method of a communication apparatus that can perform a selective polling transmission for transmitting polling transmission information designated by a polling receiving station, the program comprising:

code for a notification step, of notifying the polling receiving station of a presence or an absence of a receiving function of an SEP signal in an initial identification signal at a time of an automatic reception in an automatic receiving terminal;

code for a storage step, of storing polling transmission information in a memory; and code for a judgment step, of judging whether or not polling transmission information is stored in the memory, wherein, when polling transmission information corresponding to an SEP signal received from the polling receiving station is not stored in the memory, the notification step includes notifying the polling receiving station of the absence of the receiving function of the SEP signal.

21. A storage medium according to claim 20, wherein the memory comprises a memory box, and wherein the judgment step includes comparing a received SEP signal with an SEP signal registered in advance corresponding to the memory box, and declaring a presence or an absence of the receiving function of the SEP signal in accordance with a comparison result.

* * * * *

UNITED STATES PATENT AND TRADEMARK OFFICE
CERTIFICATE OF CORRECTION

PATENT NO.    : 6,570,677 B2
DATED         : May 27, 2003
INVENTOR(S)   : Takehiro Yoshida It is certified that error appears in the above-identified patent and that said Letters Patent is hereby corrected as shown below:

Column 7,
Line 50, "presence" should read -- a presence --.

Column 8,
Line 56, "declaring" should read -- declaring a --.

Signed and Sealed this

Nineteenth Day of August, 2003

JAMES E. ROGAN
*Director of the United States Patent and Trademark Office*